United States Patent [19]

Wyatt

[11] 4,052,589
[45] Oct. 4, 1977

[54] HEATED FOOD SERVICE SYSTEM

[75] Inventor: William B. Wyatt, Nashville, Tenn.

[73] Assignee: Aladdin Industries, Incorporated, Chicago, Ill.

[21] Appl. No.: 601,286

[22] Filed: Aug. 4, 1975

Related U.S. Application Data

[63] Continuation-in-part of Ser. No. 508,091, Sept. 23, 1974, abandoned.

[51] Int. Cl.² .............................................. F27D 11/02
[52] U.S. Cl. ....................................... 219/400; 34/196;
62/419; 62/457; 99/448; 99/474; 126/21 A;
126/246; 165/42; 165/59; 219/386; 219/433;
219/521; 312/236
[58] Field of Search .............. 219/261, 270, 276, 385,
219/386, 387, 399, 400, 432, 433, 460, 521, 530;
126/21 A, 246, 261, 262, 275 R, 275 E, 375;
62/418, 419, 371, 457, 255; 312/214, 236;
99/448, 453, 455, 474; 53/6; 214/1; 206/4, 72;
220/23.4, 23.6, 23.83; 165/59, 42; 34/196

[56] References Cited

U.S. PATENT DOCUMENTS

| 1,037,771 | 9/1912 | Hughes | 219/386 |
|---|---|---|---|
| 1,218,341 | 3/1917 | Truitt | 219/400 |
| 1,940,172 | 12/1933 | Hybinette | 126/246 |
| 1,966,410 | 7/1934 | Kaufmann | 219/400 |
| 2,210,521 | 8/1940 | Bemis | 220/23.83 |
| 2,784,662 | 3/1957 | Grosz et al. | 219/400 UX |
| 3,126,882 | 3/1964 | Hilfiber | 126/246 |
| 3,129,317 | 4/1964 | Howard | 219/387 |
| 3,205,033 | 9/1965 | Stentz | 312/236 |
| 3,221,729 | 12/1965 | Beasley et al. | 126/21 A |
| 3,261,341 | 7/1966 | Tibel | 126/21 A |
| 3,275,393 | 9/1966 | Stentz et al. | 312/214 |
| 3,299,664 | 1/1967 | Booth | 62/419 |
| 3,368,062 | 2/1968 | Gramenius et al. | 219/400 |
| 3,408,481 | 10/1968 | Golden | 219/386 |
| 3,458,686 | 7/1969 | Gvozdjak | 219/400 |
| 3,674,982 | 7/1972 | Hoyt et al. | 219/400 X |
| 3,799,143 | 3/1974 | Bridges | 126/246 |
| 3,806,699 | 4/1974 | Hannivig | 219/387 |
| 3,982,584 | 9/1976 | Spanoudis | 165/42 |

FOREIGN PATENT DOCUMENTS

| 664,461 | 1/1952 | United Kingdom | 219/400 |
|---|---|---|---|
| 1,117,192 | 6/1968 | United Kingdom | 219/400 |

Primary Examiner—Volodymyr Y. Mayewsky

[57] ABSTRACT

A food service system for institutional or other use is provided by a stack of insulated trays and a cart. In one embodiment the cart includes a heating and/or cooling source with an outlet and a return. The trays are provided with openings to permit the passage of heated or cooled air from the outlet through the stack to the return. In another embodiment the trays and cart are combined with a refrigeration unit and a heating unit to permit simultaneous heating and cooling of food portions held in the trays.

11 Claims, 17 Drawing Figures

HEATED FOOD SERVICE SYSTEM

BACKGROUND OF THE INVENTION

This application is a continuation-in-part of my copending application Ser. No. 508,091, filed Sept. 23, 1974, now abandoned.

This invention relates generally to food service systems. More specifically, it relates to improvements in such systems wherein means are provided to continuously heat prepared food while it is awaiting service to the consumer.

A common arrangement in the prior art for heating food to and holding it at desired temperatures while it is awaiting service is the provision of a cabinet usually thermally insulated and provided with a multiplicity of shelves or drawers and a heating means together with some kind of an arrangement to permit the heated air to circulate throughout the cabinet. One such arrangement is that shown in the U.S. Pat. to Howard No. 3,129,317 in which a heating element is disposed at the bottom of an insulated cabinet and apertures are provided in vertically spaced shelves to permit the passage of heated air. A somewhat different arrangement is shown in the U.S. Pat. to Slentz et al No. 3,275,393 wherein heating and cooling coils are provided in the side walls of a multishelved wheeled cart. The U.S. Pat. to Booth No. 3,299,664 discloses a refrigerator with an insulated cabinet and a blower for forcing air over cooling coils through a space around the side walls and through openings over shelves enclosed within the cabinet to return back to the blower. A somewhat similar arrangement is shown in the U.S. Pat. to Gvozdjak No. 3,458,686 which shows an insulated oven with sliding drawers together with means for circulating heat around the oven and into the drawers.

As may be seen, each of these patents and the other prior art with which the applicant is familiar contemplate the provision of a multi-shelved or drawered cabinet on or in which food on trays or other receptacles may be kept. Such constructions must of necessity be relatively costly and cumbersome.

In the U.S. Pat. to Bridges No. 3,799,143 there is disclosed stackable trays and heating or cooling elements mounted in a cart for the transporting of the trays. Heated or cooled air is permitted to travel upwardly through openings provided in the trays. However, there is no means whereby forced convection can be achieved as no return passages are provided.

It is believed that a reliable, more practical and more economical system can be provided by the system disclosed in this application.

Therefore, it is an object of this invention to provide a novel food service system for storing prepared food awaiting service which may be brought to and maintained at desired serving temperatures and which is relatively simple and economical.

It is another object of this invention to provide a novel food service system which may be easily transported and used.

It is a further object of this invention to provide a novel food service system which is constructed so as to reduce the amount of labor required for its usage and therefore may be able to permit considerable economies in use.

BRIEF SUMMARY OF THE INVENTION

The foregoing and other objects of the invention are achieved in one embodiment thereof by the provision of a plurality of compartmented trays stacked one on top of the other and on the top of a base structure provided with a heated or cooled air source and return. The trays once stacked provide vertical columns of compartments each with apertures so as to permit the forced circulation of heated or cooled air upward through the stack and downward to the return.

BRIEF DESCRIPTION OF THE DRAWINGS

The invention itself is set forth in the claims appended hereto and forming a part of this specification while an understanding of embodiments thereof may be had by reference to the detailed description taken in conjunction with the accompanying drawings in which:

DETAILED DESCRIPTION

Figure 1:
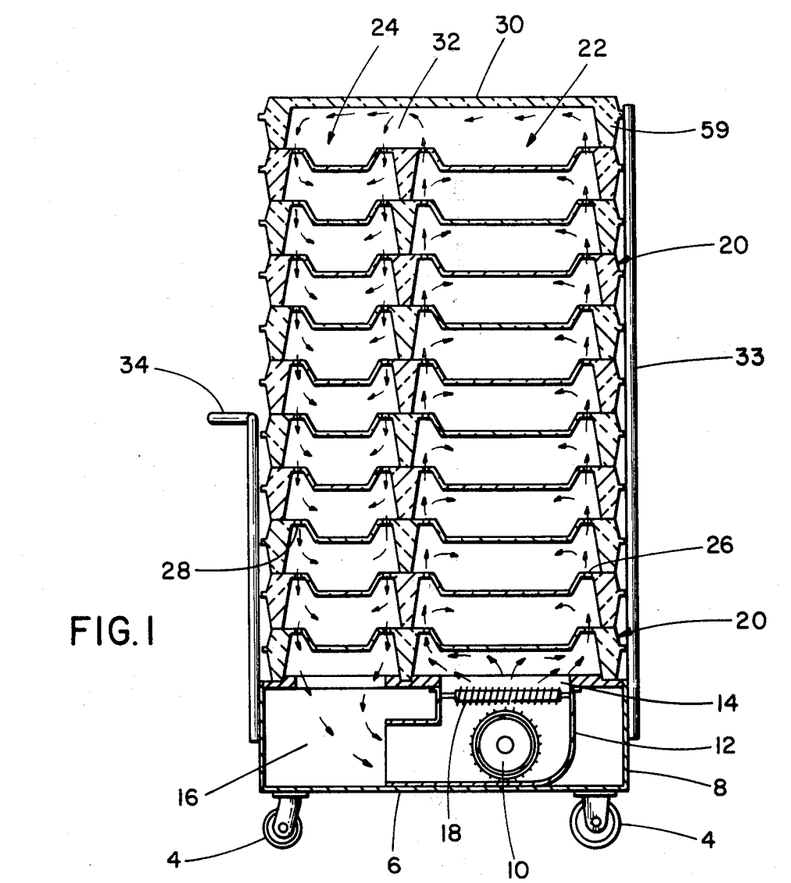
FIG. 1 is a side view partially in section of one embodiment of the invention.

Referring first to FIG. 1, there is shown a base structure 2 which may, if desired, be provided with wheels 4 so as to be transportable. The base may be constructed out of any suitable material such as stainless steel and may be generally rectangular in cross-section configuration. Supported on a bottom 6 of the base structure and in the space encompassed by the side walls 8 thereof is a blower 10 having a casing 12 provided with a heated air outlet 14 and a cold air return inlet 16. Heating means in the form of a resistance heating coil 18 may be provided in the heated air outlet 14 so that as the blower operates air is drawn in through the inlet 16 and blown over the heater 18 through the outlet 14.

When in use a plurality of trays 20, thermally insulated and compartmented as described, are disposed on the top of the base structure to form a stack of such trays. When so stacked, the trays provide at least two vertical columns of compartments 22 and 24. The compartments in each tray in one of the columns are provided with access to the other compartments by means of apertures 26 in the column 22 and apertures 28 in the column 24. An insulated cover 30 is provided at the top of the stack on the top tray 20 and provided a passage 32 whereby heated air may flow from the column 22 to the column 24.

In operation, therefore, air forced by the blower 10 over the heater 18 travels upwardly in the column 22 through the apertures 26 so as to heat the food in the compartment of each tray 20 in that column and through the passage 32 downward in the column 24 through the apertures 28 in that column. In this fashion, food, previously cooled by refrigeration, may be held in any one of the compartments in the columns 22 and 24 and raised to and maintained at a desired serving temperature while awaiting service to a comsumer. The arrangement is such that a main course or entree could be held in the compartments in column 22 while another course such as a vegetable or soup could be held in the compartments in column 24. If desired, another configuration might be one in which both vertical air columns are contained within the entree cavity. The trays may be preloaded in a central food preparation area, held there while the blower is connected to an electrical source and then transported to the place of consumption. If desired or necessary, the blower may once again be connected to an electrical source until service is desired or completed. Service is effected by removing individual trays 26 from the stack as needed while maintaining the cover 30 on top of the stack in order to continue the temperature maintaining capabilities of the system.

As will be described hereinafter, each tray may be provided with interengaging elements so as to facilitate their stacking and for another purpose. However, if found necessary, a vertically extending guide in the form of one or more tube-like elements 33 may extend upwardly from the base 2 to help insure the stability of the stack of trays while in motion. Likewise, any suitable handle 34 may be provided on the base to be used by an operator to push the base with its stack of trays to any desired location.

Referring now to FIGS. 2 through 5, the construction of each tray in one embodiment of the invention may be understood.

In connection with the description of a tray 20 to follow, it should be appreciated that the drawings and description are by way of exemplification only for obviously there may be a wide variety of design variations as, for instance, in the number of compartments, the configuration of individual compartments, the physical relationship of the compartments and in other aspects.

Figure 2:
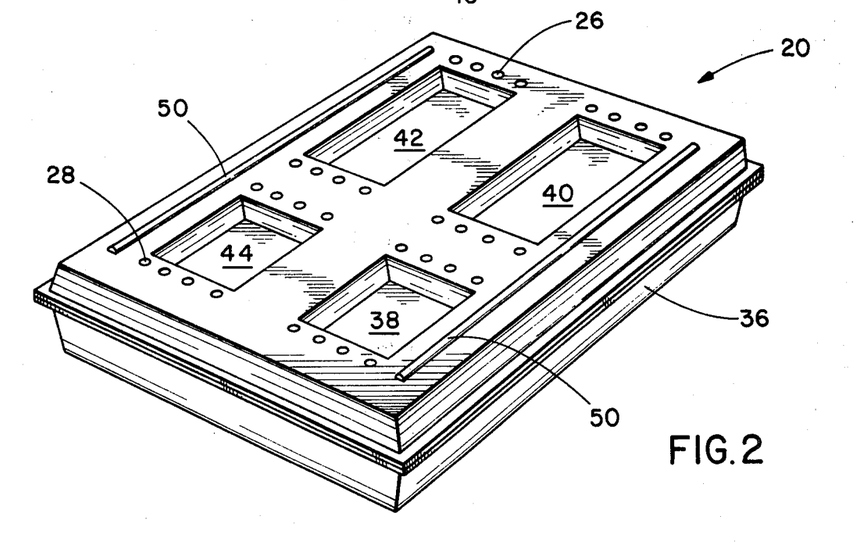
FIG. 2 is a perspective illustration of an embodiment of a compartmented tray forming a part of the invention.
Figure 3:
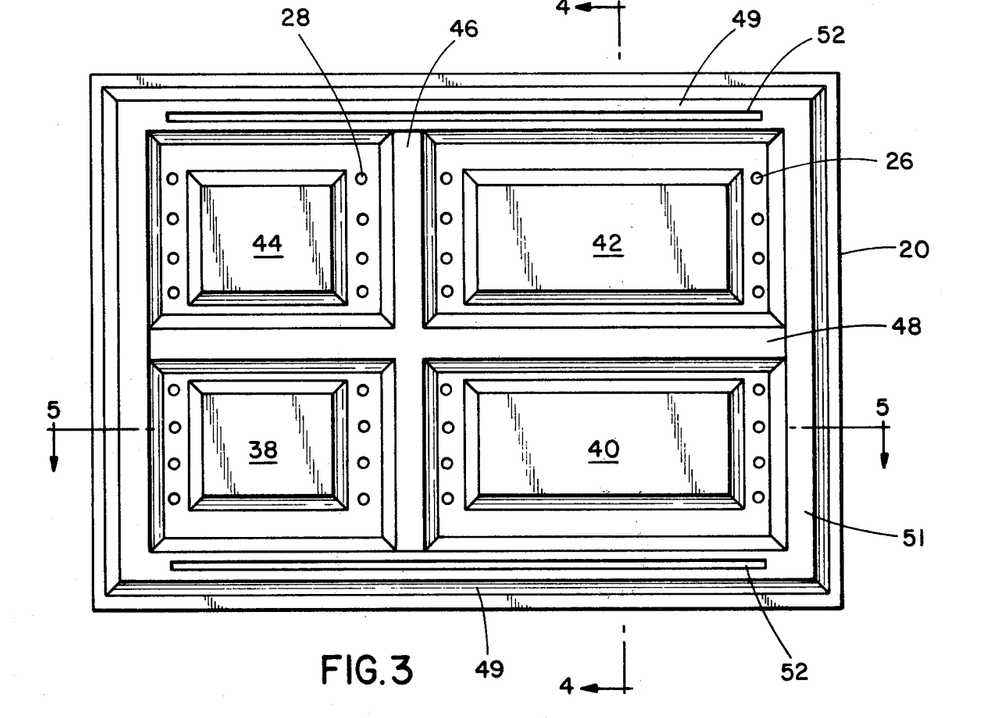
FIG. 3 is a bottom view of the tray of FIG. 2.
Figure 4:
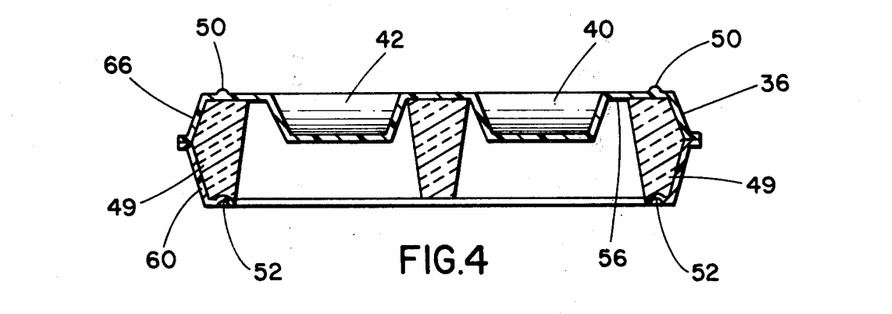
FIG. 4 is a view along the line 4—4 of FIG. 2.
Figure 5:
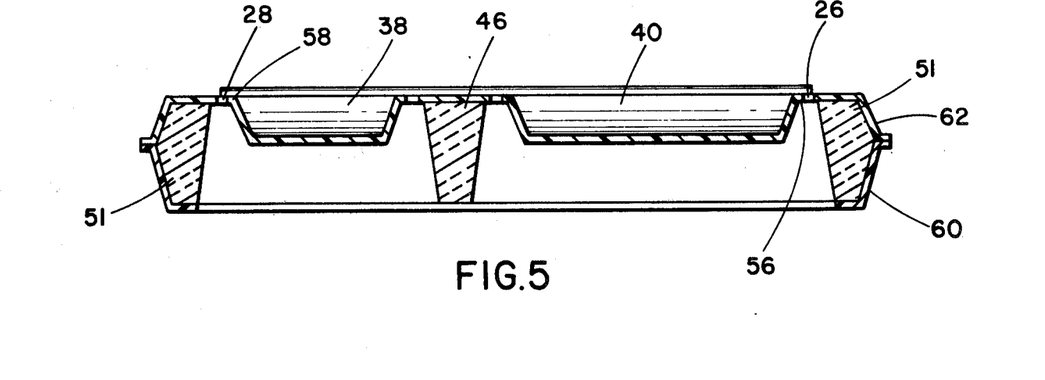
FIG. 5 is a view along the line 5—5 of FIG. 2.

Thus, in the illustrated embodiment a tray 20 may be provided with insulated side walls 36 and a plurality of recessed compartments 38, 40, 42 and 44 opening to its upper surface. As is best seen in FIG. 3, thermally insulated portions 46, 48, 49 and 51 extend from the inside walls 36 to divide the tray into the compartments as described and to provide thermal insulation in the horizontal direction between any one compartment and any adjoining compartment. As the result of this arrangement, thermal insulation is provided completely around each compartment in the horizontal direction so as to insulate one compartment from another and from the outside. By reference to FIGS. 4 and 5 the insulation 48 separating the compartment 38 and 40 from the compartments 44 and 42 and the insulation 46 separating the compartments 38 and 44 from the compartments 40 and 42 may be seen.

In order to facilitate stacking of the trays 20, the upper surface of each tray may be provided with a ridge or tongue 50 around its outer edge and encompassing the various compartments. As seen in FIG. 3, a matching groove 52 for engaging with the ridge 50 may be formed on the bottom surface of each tray. The trays may then be stacked one on top of the other with a tongue 50 engaging in the groove 52 of the tray above to provide a positive interengagement thereby adding stability to a stack of trays. In addition to providing for such stability, the engagement of a tongue 50 in a groove 52 will also serve to provide thermal seals in a stack of trays. It may be found unnecessary to provide the tongue and groove described, in which case it may be eliminated. Alternatively, it need not be in the form of an uninterrupted tongue or groove as shown but rather stability may be provided by various kinds of interengaging elements on the tops and bottoms of the trays.

The compartments or receptacles 38, 40, 42 and 44 may be shaped as desired to accommodate plates and dishes of various sizes and configurations and also for the purpose of achieving desired aesthetic effects. In accordance with the invention, the compartments 40 of each tray are structurally connected to the insulating portions 46 and to the side walls by ledges 54. Provided in each ledge 54 are a plurality of apertures or openings 26. The compartments 38 are formed in a similar fashion with ledges 58 provided with the apertures or openings 28.

By virtue of the construction described, then the trays are stacked one on top of the other. The compartments 40 constitute the column 22 positioned above the hot air outlet 14 while the compartments 38 constitute the column 24 positioned above the cold air return 16.

The system is closed or completed by the provision of the cover 30 provided with insulated side walls 59 around its periphery but open within the side walls to provide the passage 32 from the column 22 to the column 24.

The individual trays may be constructed in a number of different ways but it has been found advantageous to form them by vacuum forming a lower shell 60 and an upper shell 62. Before the shells are assembled to each other a quantity of a foamable plastic material is placed in one of the shells, the other shell placed on top and the foamable material activated by the application of a suitable amount of heat or activator so as to foam and fill the space between the shells with a foamed plastic providing the desired thermal insulation.

In some instances, it may be desired to provide for both heating and cooling of foods in the same tray, that is, a meal service might include hot dishes as well as cold in which case it would be desired to maintain the foods at their optimum temperatures whatever they may be. To accomplish this the embodiment illustrated in FIG. 6 may be used. In this embodiment, a base structure 2' is provided with a heating element 18' disposed adjacent an outlet 14' and a blower 10'. As explained in connection with the embodiment of FIG. 1, a column 22' cooperates with a column 24' to provide for circulation of heated air from the outlet 14' to an inlet or cold air return 16'.

Figure 6:
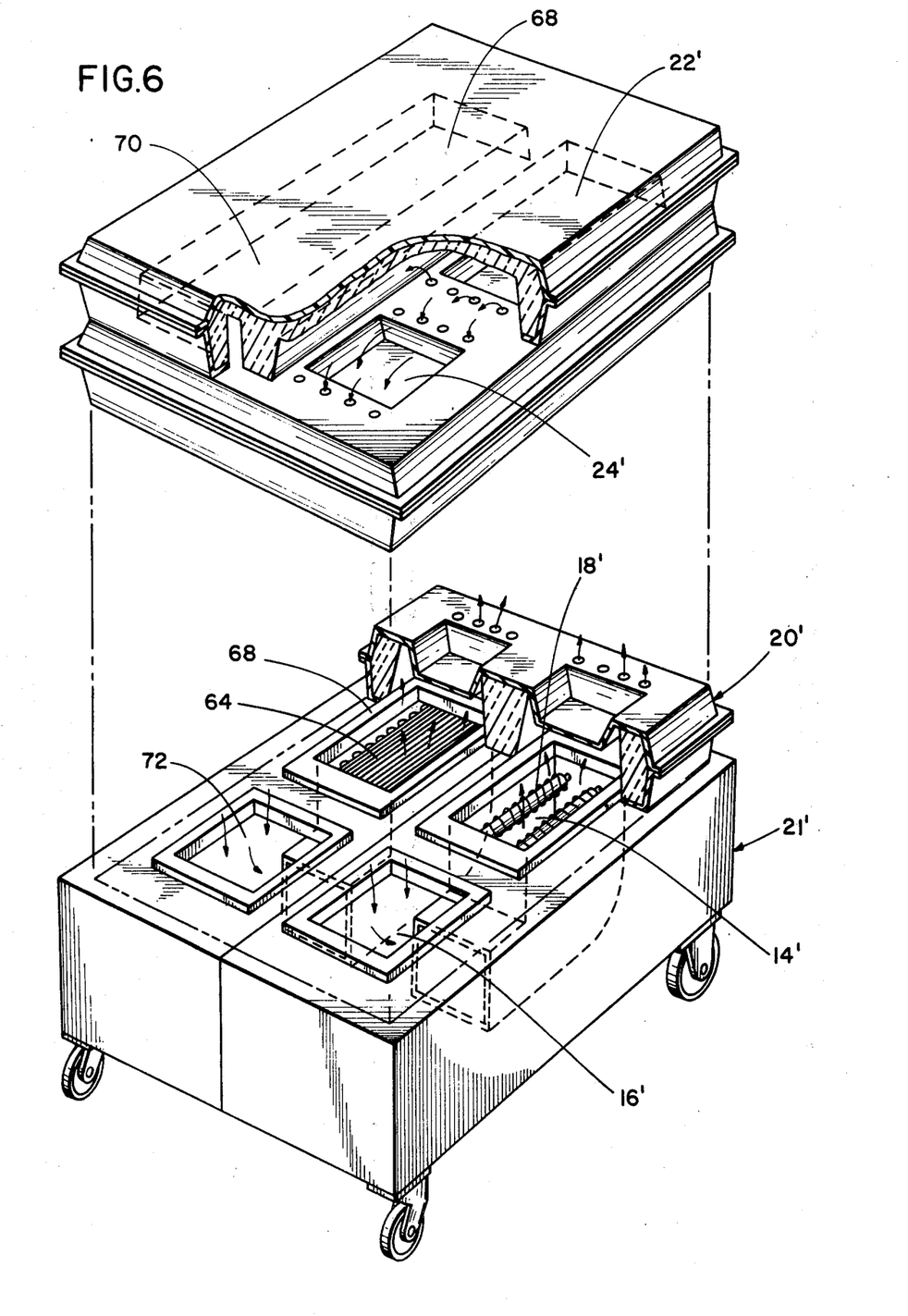
FIG. 6 is a side view partially in section of another embodiment of the invention.

Mounted in the same base structure 2', but spaced from the heating element 18', is a cooling or refrigeration unit 60 circulating a suitable coolant through coils 64 over which air is blown from the blower. The cold air may pass upward through a column 66 from an outlet 68 and return downward through a column 70 to an inlet 72. This embodiment of the invention therefore provides a means where some foods may be maintained hot while others cold.

In some instances it may be found desirable to reduce the volume of spaced being heated or cooled. In such cases the embodiment of FIG. 7 may be used. This figure illustrates a base structure 74 in which is mounted a blower 76 having a pair of outlets 78 and 80 and a pair of inlets 82 and 84. Heating elements 86 and 88 are mounted in the outlets 78 and 80, respectively. Supported on the top of the base structure 74 are a plurality of trays constructed similarly to the trays 20 of FIG. 1. As in the case of the embodiment of FIG. 1 an insulated cover 92 is provided at the top of the stack. The insulated cover 92, however, differs from the cover 30 of FIG. 1 in that an insulated divider 94 depends outwardly from the lower surface of the top of the cover to divide and isolate the stack of trays 90 into two separate vertical columns 96 and 98.

Figure 7:
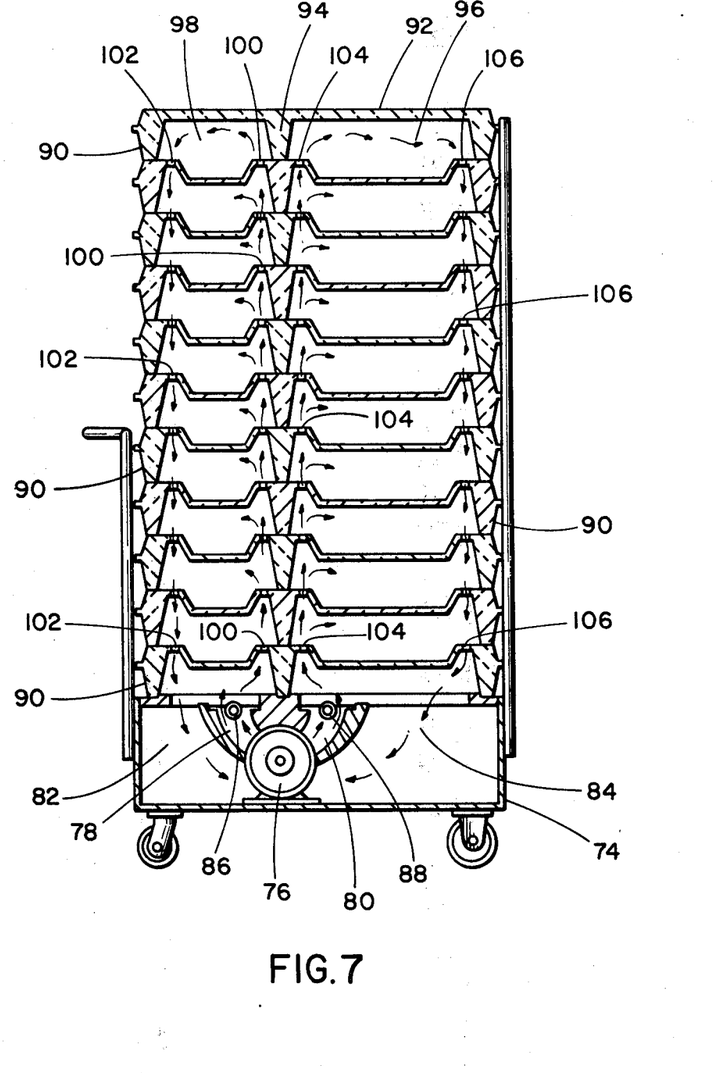
FIG. 7 is a side view partially in section of still another embodiment of the invention.

In this embodiment of the invention air from the blower 76 passing through the outlet 78 and heated by the element 86 passes upwardly through the openings 100 in each tray 90 heating the food in each tray compartment and is drawn upwardly through the openings 102 to the return 82. In this fashion only one column 98 is heated and therefore the volume required to be heated by the element 86 is reduced over the volume required to be heated in the embodiment of FIG. 1.

A similar mode of operation takes place in the vertical column 96 utilizing the outlet 80, the heating element 88, openings 104 and openings 106.

FIGS. 8 through 17 illustrate still another embodiment of the invention. This embodiment may find particular utility in an institution whereby meals are prepared ahead of time for service later. For instance, in a hospital or nursing home it is relatively expensive to prepare and serve meals over a weekend or a holiday because of the necessity to pay food service personnel premium pay for working on such occasions. Also on any day it may be necessary to have food preparation personnel stay late for evening meals and for no other purpose. In other words, preparing and serving meals at regular times very frequently requires an inefficient use of people. Therefore, to the extent meals can be prepared at one time for service later, more efficient use of food preparation personnel can be achieved.

A difficulty arises however in that most meals consist of some food items which are chilled or cold while others are hot. It is believed that heretofore the only way this difficulty could be dealt with was to separately heat hot items previously maintained cold in a refrigerator and then assembled on a tray with the desired cold items at meal times. As will be seen, the embodiment of the invention to be described permits prepreparation, preassembly, storage and heating of the food items intended to be served hot, thereby reducing the number of people required to effect actual food service and more efficient use of food preparation personnel.

Figures 8, 9:
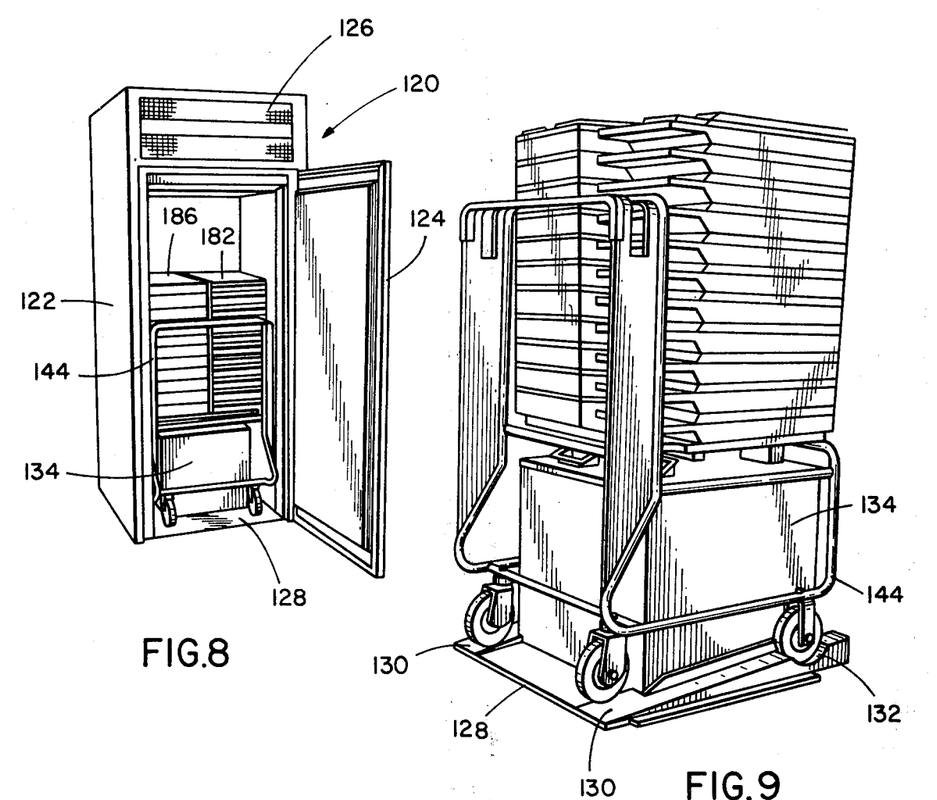
FIG. 8 is a perspective illustration of another embodiment of the invention.
FIG. 9 is a perspective illustration of elements of the embodiment shown in FIG. 8 when in one operative relationship.
Figure 10:
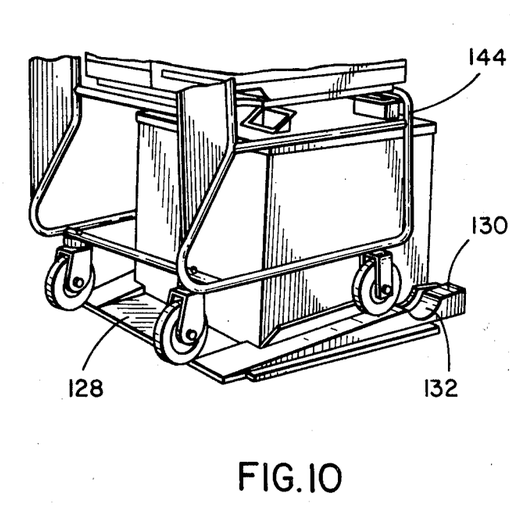
FIG. 10 is a perspective illustration of elements of the embodiment shown in FIG. 8 in another operative relationship.
Figure 13:
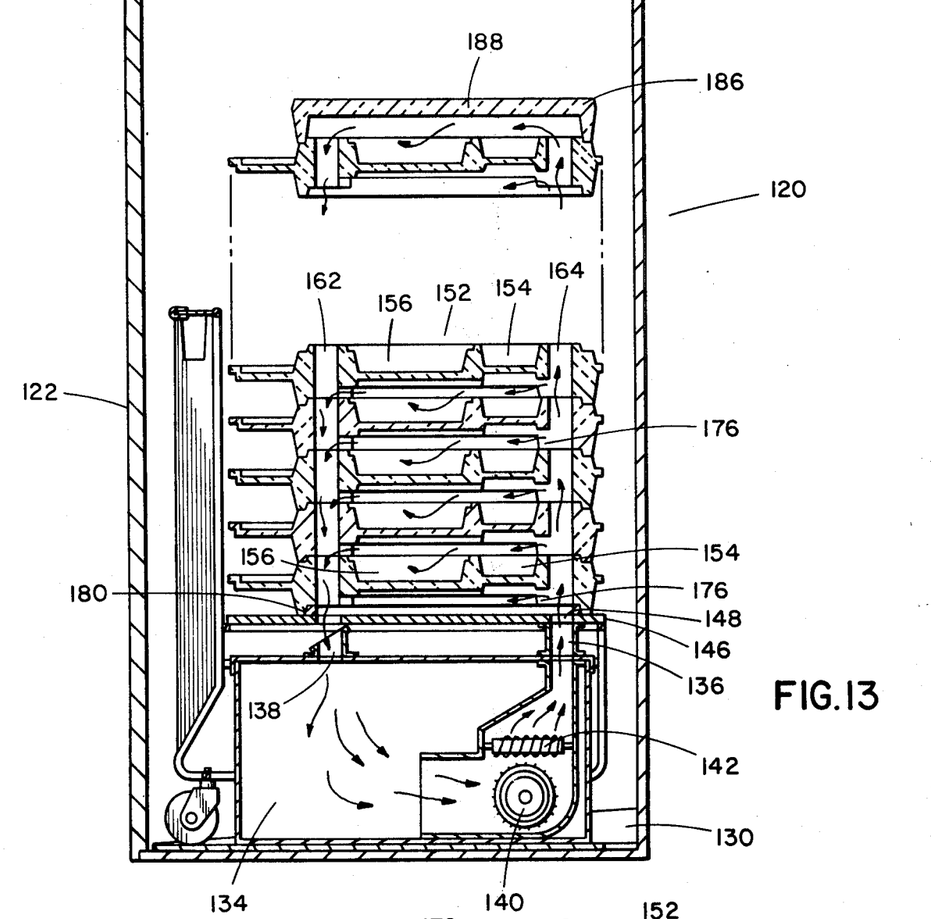
FIG. 13 is a partial sectional view of the embodiment of FIG. 8.

Referring now to FIGS. 8 and 13, this embodiment of the invention comprises a refrigerator 120 having insulated side walls 122, an insulated door 124 and a refrigeration unit mounted at 126. Positioned in the bottom of the refrigerator is a base 128 provided on opposite sides with inclined surfaces or ramps 130. Toward the higher end of each ramp 130 is a cutout portion or recess 132.

Figure 11:
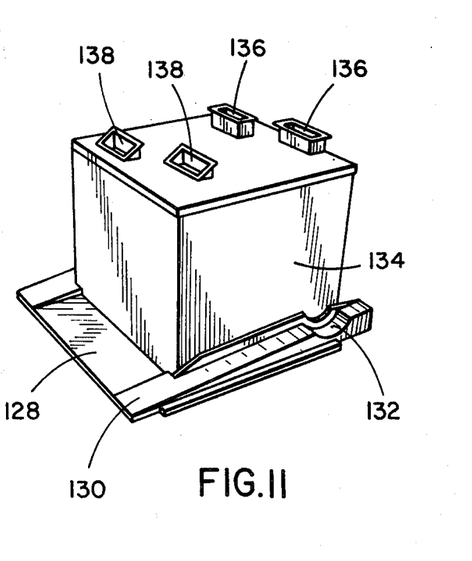
FIG. 11 is an illustration of a heater-blower forming a part of the embodiment of FIG. 8.

Also positioned in the refrigerator is a heater-blower unit 134 consisting in this embodiment of a pair of hot air outlets 136 and a pair of cold air return inlets 138. Included in the heater-blower unit 134 is a fan 140 and a heating element such as a resistance heating element 142. Thus the heater-blower unit is arranged to draw in return air through the opening 138 and blow out heated air through the opening 136.

Figure 12:
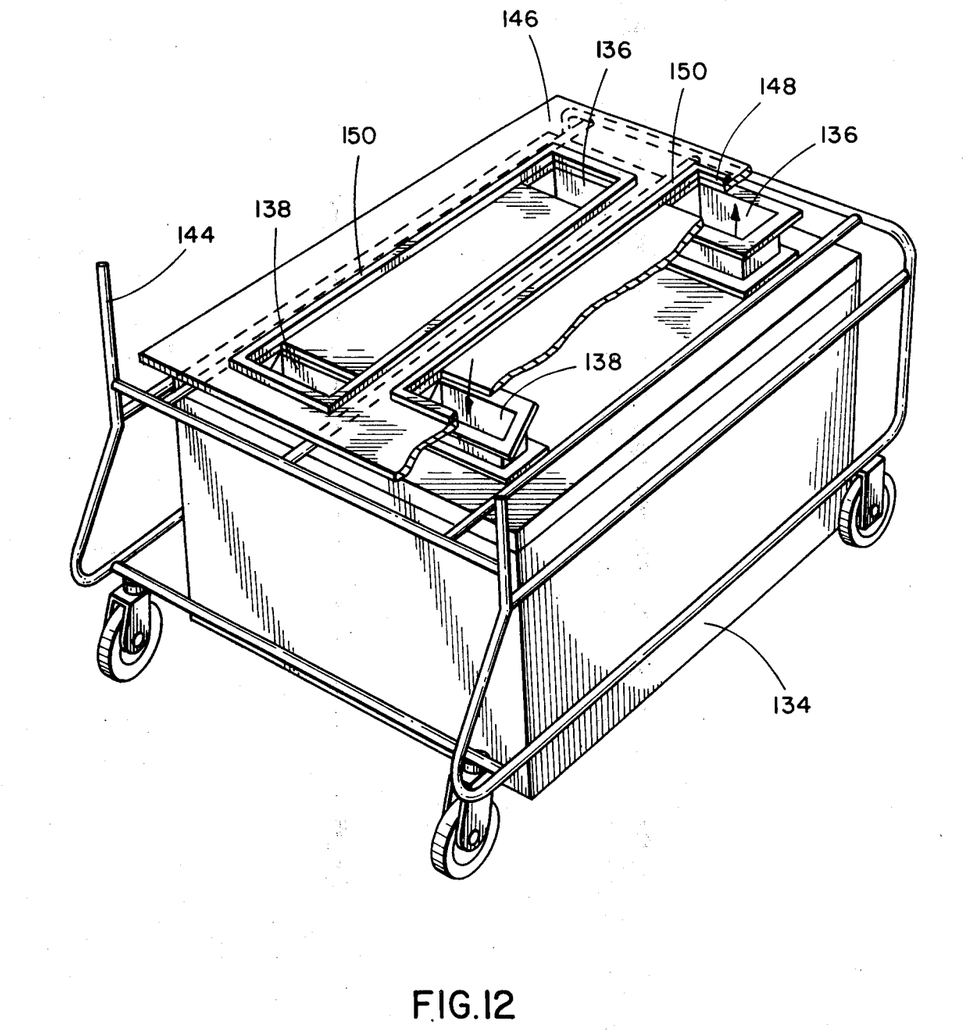
FIG. 12 is a perspective illustration of the cart and heater-blower of FIG. 8 showing their positional relationship.

A cart 144 of any suitable design and provided with a support surface 146 may be moved in and out of the refrigerator with its wheels dimensioned to travel up and down the ramps 130. As may be seen in FIG. 10, when the cart 144 is advanced into the refrigerator or withdrawn therefrom the wheels travel on the ramps 130 until they engage into the recesses 132. The support surface 146 is mounted on the cart to overlie the heater-blower 134 and is provided with openings 148 shaped and spaced to conform and register with the outlet and return openings 136 and 138. Also provided on the supporting surface 146 are ridges or guide surfaces 150 for a purpose to be described hereinafter. Thus as the cart is advanced into the refrigerator the wheels travel up the ramps 130 so that the cart is tilted back slightly toward the operator. When the wheels engage in the recesses 132 the cart drops back to a substantially level position, at which time the openings 148 overlie the outlets 136 and returns 138.

FIGS. 14 through 17 illustrate trays 152 which cooperate with the structure described to achieve the objects of the invention.

Figure 14:
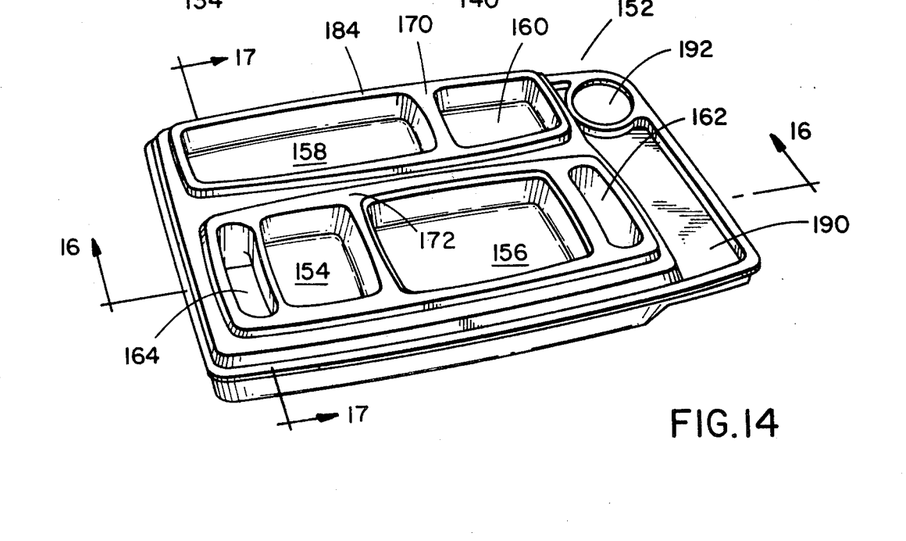
FIG. 14 is a perspective illustration of the top surface of an embodiment of a tray forming a part of the embodiment of FIG. 8.

Each tray consists of a plurality of receptacles 154 and 156 shaped to receive dishes holding food items intended to be served hot. Additional receptacles 158 and 160 are provided to receive dishes holding food items intended to be served cold. The particular design of the food holding receptacles, and their number can be left to the choice of the designer, for, as will be seen, it is only important that the receptacles intended to hold hot food be placed in the path of a flow of heated air.

In this embodiment the path is provided by openings 162 and 164 on opposite ends of the receptacles 154 and 156.

Figure 15:
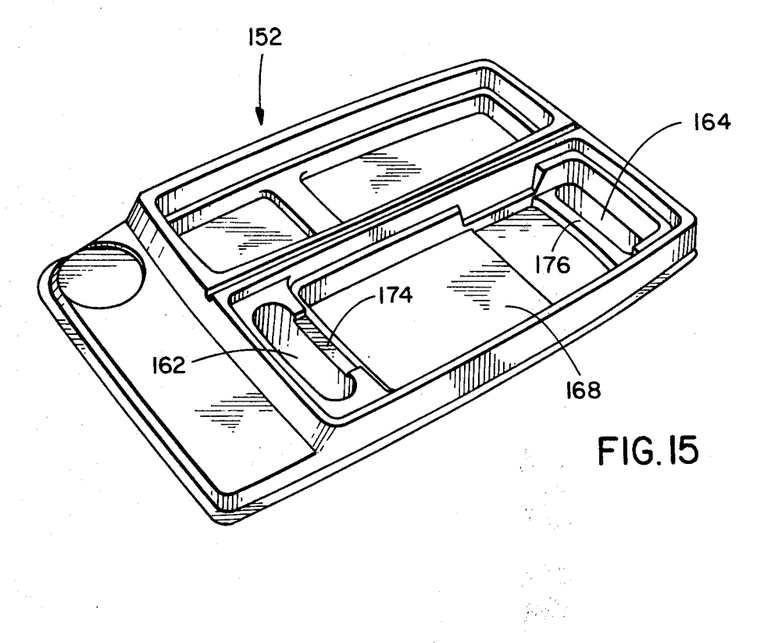
FIG. 15 is a perspective illustration of the bottom surface of an embodiment of a tray forming a part of the embodiment of FIG. 8.
Figure 16:
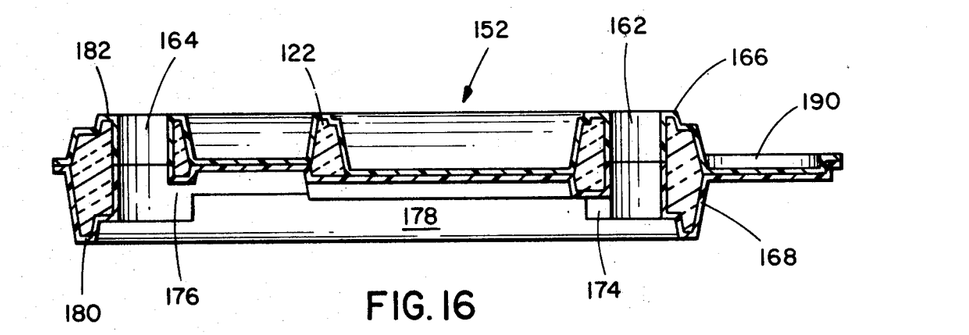
FIG. 16 is a view along the line 16—16 of FIG. 14.
Figure 17:
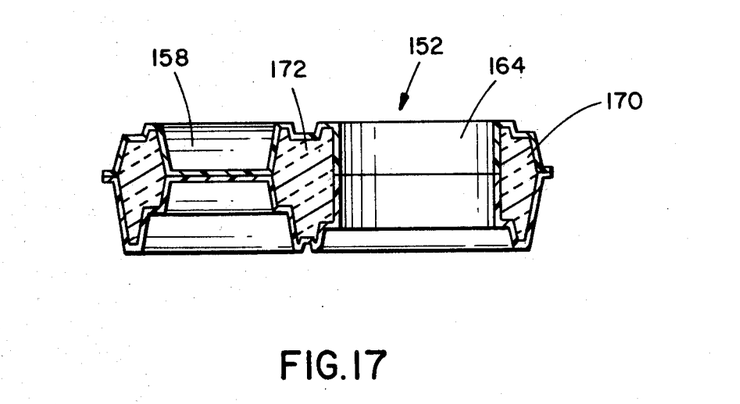
FIG. 17 is a view along the line 17—17 of FIG. 14.

The tray itself may be formed of an upper surface 166 molded from a sheet of plastic material to form a skin or cover, and a lower surface formed in the same fashion to constitute a lower skin or cover 168. Thermal insulation around the periphery 170 of the tray and between the food holding receptacles as shown at 172 may be provided by foaming in place a suitable plastic material. Provided on the lower surface 168 on the side of the tray on which the hot food receptacles 154 and 156 are formed are slots or openings 174 and 176 connecting to the openings 162 and 164, respectively. The slots thus provide a passage 178 across the bottom of each tray from the opening 162 to the opening 164. Each tray is provided with a lower guide and sealing surface 180 and an upper guide and sealing surface 182 around its periphery whereby the trays may be stacked one on the other with the guide surface 180 of a tray above resting on the guide surface 182 of the tray below. The guide surfaces may be shaped to overlap each other as shown in the drawing, particularly FIG. 13, so as to provide a thermal seal around each tray. Also as shown in FIG. 14, separate guide surfaces 184 may be provided to encompass the cold food holding receptacles 158 and 160.

As the result of this construction, when the trays 152 are stacked one on top of the other the hot food holding receptacles are thermally insulated from the cold food holding receptacles and all of the food holding receptacles are insulated from the outside air.

At the top of each stack of trays there is provided an insulated cover 186 which is dimensioned to overlie a tray 152 and provide a closed passage 188 connecting an opening 164 to an opening 162. Each tray may be provided with a surface 190 to hold silverware and condiments and a recess or opening 192 for holding a beverage container when the trays are to be used at the time of food service.

In use the food portions to be served may be placed in dishes either of the reusable variety or single use variety, and the dishes then disposed in the appropriate food holding receptacles 154, 156, 158 or 160, depending on whether the food item is intended to be served hot or cold. A first tray is then placed on the supporting surface 146 of the cart with its guide surfaces 182 overlying and engaging with a holding surface 150. When so placed an opening 162 is in registering with the cold air return 138 while the opening 164 is in registering with the hot air outlet 136. Additional trays are then stacked one on top of the other with their supporting surfaces interengaging as described so that a vertical column of openings 162 is formed as is a spaced vertical column of openings 164. The cart loaded with trays is then moved into the refrigerator 120 advancing up the ramps 130 until the front wheels of the cart drop into the recesses 132. When so loaded and positioned the trays will then hold the food at desired refrigerating temperatures for whatever period is wanted. At some time prior to the time when it is desired to serve the meals now assembled on the trays and maintained in a refrigerated condition the heater-blower may be activated either manually or by a time controlled switch. When the heater-blower is actuated hot air is blown upwardly through the opening 136 and the column of openings 164. During this period the air is forced through the openings 164 and also through the slots 176, through the passage 178 over the food in the receptacles 154 and 156, out through the slots 176 and is returned downwardly through the column of openings 162 to the return 138. The cover 186 provides, by means of its passage 188, a closed path for the heated air being blown as described. Thus the food in the side of the tray being so heated is raised to a desired serving temperature while the food on the side of the trays constituted by the compartments 158 and 160 is maintained at substantially the temperature at which it was being held in the refrigerator. In this manner it is possible to maintain foods in the same tray at a desired cold temperature for storage and to heat those foods which it is desired to heat in time for service. When the food has reached its desired temperature the cart is removed from the refrigerator and then transported to a desired service location where individual trays are dispensed.

A number of design variations have been suggested above and others are possible. It is intended by the claims appended hereto to encompass all such variations as are properly within their scope.

What is claimed as new and desired to be secured by Letters Patent is:

1. A food service system comprising a closed base structure having an inlet and an outlet provided therein, means to change the air temperature from the ambient means in said base structure for supplying forced air other than at ambient temperature through said outlet, a stack of matched separable trays each having compartments thermally insulated from each other disposed on top of said base structure, one compartment in each tray positioned over a corresponding compartment in a tray below to form a first column of compartments, another compartment in each tray positioned over a corresponding compartment in a tray below to form a second column of compartments, said trays disposed on said base structure with said first column positioned over said outlet and said second positioned over said inlet, openings around said compartments in said first and second columns permitting air to flow upward in said first column from said outlet and downward in said second column to said inlet and means having a closed passage connecting said first column to said second column.

2. A food service system as set forth in claim 1 wherein said trays are provided with means providing thermal insulation in the horizontal direction.

3. A food service system as set forth in claim 1, wherein said last mentioned means comprises a cover on the top tray of said stack of trays and wherein said cover has a closed passage extending from said first column to said second column.

4. A food service system as set forth in claim 1 wherein said means for supplying air comprises a blower in said base structure and a heating element mounted adjacent said outlet.

5. A food service system as set forth in claim 1 wherein said means for supplying air comprises a blower in said base structure and a cooling element mounted adjacent said outlet.

6. A food service system as set forth in claim 1 wherein said trays are provided with matching elements on their top and bottom surface whereby an element on the bottom of one tray interengaged with a matching element on the top of the tray below.

7. A food service system as set forth in claim 1 wherein said trays are provided with means providing thermal insulation in the horizontal direction, and wherein said means for supplying air comprises a blower in said base structure and a heating element mounted adjacent said outlet.

8. A food service system as set forth in claim 7, including a cover on the top tray of said stack of trays, and wherein said cover has a closed passage extending from said first column to said second column.

9. A food service system as set forth in claim 1 wherein said trays are provided with means providing thermal insulation in the horizontal direction, and wherein said means for supplying air comprises a blower in said base structure and a cooling element mounted adjacent said outlet.

10. A food service system as set forth in claim 9, including a cover on the top tray of said stack of trays, and wherein said cover has a closed passage extending from said first column to said second column.

11. A food service system as set forth in claim 10 wherein said trays are provided with matching elements on their top and bottom surfaces whereby an element on the bottom of one tray is interengaged with a matching element on the top of the tray below.

* * * * *